No. 704,768. Patented July 15, 1902.
S. SWEENEY.
REFRIGERATOR, FREEZER, AND CHURN.
(Application filed Sept. 9, 1901.)
(No Model.)
Fig. 1.
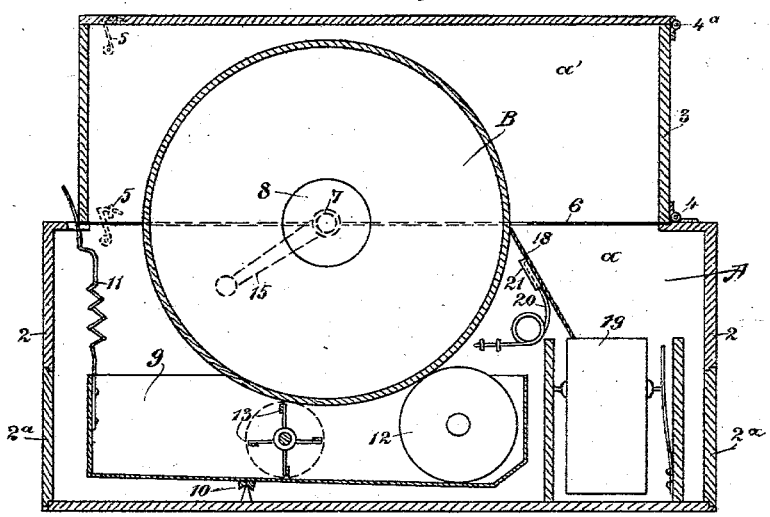
Fig. 2. Fig. 3. Fig. 4.
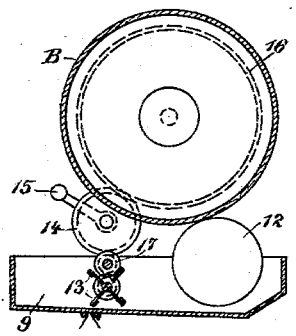 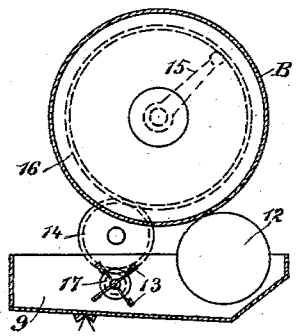 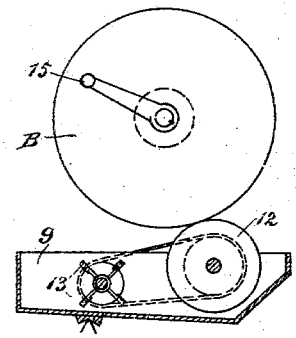
Fig. 5.
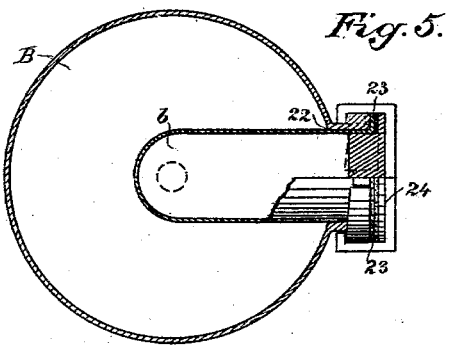
Witnesses,
Inventor,
Samuel Sweeney
By Dewey Strong
Atty

UNITED STATES PATENT OFFICE.

SAMUEL SWEENEY, OF SAN FRANCISCO, CALIFORNIA.

REFRIGERATOR, FREEZER, AND CHURN.

SPECIFICATION forming part of Letters Patent No. 704,768, dated July 15, 1902.

Application filed September 9, 1901. Serial No. 74,782. (No model.)

*To all whom it may concern:*

Be it known that I, SAMUEL SWEENEY, a citizen of the United States, residing in the city and county of San Francisco, State of California, have invented an Improved Refrigerator, Freezer, and Churn; and I hereby declare the following to be a full, clear, and exact description of the same.

My invention relates to refrigerating devices. Its object is to supply a machine simple in construction and economical in cost capable for use as a combined freezer, churn, and cooler.

It consists of a box, hinged closures therefor, a cylinder revoluble within said box and adapted to hold a freezing mixture, a pan pivoted in said box and beneath the cylinder and in which the cream or other matter to be frozen is contained, a distributing-roller by which the cream is deposited on the periphery of the cylinder, an agitator by which the cream is whipped before being deposited on the cylinder, said agitator and roller contained within the cream-pan, means whereby the pan is turned on its pivots to bring the roller into engagement with the cylinder when the lid of the box is closed and to discontinue said engagement when the lid is raised, and means for revolving the cylinder.

It also comprises details more fully to be set forth hereinafter, having reference to the accompanying drawings.

Figure 1 is a vertical longitudinal section through the apparatus. Figs. 2, 3, and 4 are modifications for driving the different parts. Fig. 5 shows the apparatus when used as a churn.

A represents a refrigerator-box having end closures 2 and a top 3, hinged, as at 4. Suitable locking devices 5 are provided whereby the cover may be held securely when closed. The upper surface of the cover is also hinged, as at 4ª. The box has a horizontal partition 6, approximately flush with the ends of the box, and in this partition a transverse opening is made to admit the freezing-cylinder B. This cylinder is hung on its trunnions 7, resting in journals on the sides of the box and in the plane of the partition. The cylinder B is made with an end opening through which the freezing mixture is introduced, and this opening is provided with a water-tight closure 8 of any well-known or suitable design, it being absolutely essential that none of the contents of the cylinder escape. Situated beneath the cylinder is the pan 9, in which the cream or other matter to be frozen is contained. This pan is pivotally mounted rearward of its center of gravity, as at 10, so that its tendency is to tip forward. The rear of the pan is provided with a resilient projection, as a spring 11, which is adapted to be engaged by the lid 3 when the latter is closed and locked. The engagement of this projection with the lid causes the pan to oscillate, whereupon the roller 12, suitably trunnioned in the pan, is brought into contact with the periphery of the cylinder. A revoluble agitator 13 is also mounted in this pan and may be driven either by peripheral contact with the cylinder, as in Fig. 1, or by separate connections with a suitable crank mechanism by which the cylinder is revolved.

In Fig. 2 is shown a gear-wheel 14, having a crank 15. This gear meshes with a gear 16 on the end of the cylinder and also with a gear 17, which latter in turn engages a gear on the agitator. Where this gearing is dispensed with, as in the first instance, and the agitator and roller driven by frictional contact with the cylinder, the latter may be operated direct by means of a crank 15 on the extension of one of its trunnions through the side of the box. The cream taken up by the roller is distributed in a thin layer upon the cylinder, where, by reason of the mixture within the cylinder, this layer becomes frozen during the revolution of the cylinder. The congealed product is removed by means of a knife or guide 18 and directed into a suitable receptacle 19. This knife is resiliently supported by means of the spring-arms 20. One end of these arms is secured to the box, and the other end removably fits the sockets 21 upon the back of the knife. The latter thus bears adjustably and equally upon the cylinder and may be readily removed when in need of cleaning or when it is desired to use the box as a simple refrigerator. When it is desired so to adapt the box, it is only necessary to remove the pan and its contained gearing, whereupon a cooling-chamber *a* is formed below the partition 6. Access thereto is had through the doors 2ª. Ice is contained, as before, in the cylinder B. A chamber $a'$ is formed also above the partition when the cover is closed, so that, if desired, articles in one chamber may be entirely separated from those in the other, while both will be equally exposed to the cooling agency of the cylinder. Furthermore, such a refrigerator is perfectly dry, as there is no escape of water from the melting ice.

The whole device can be taken apart at a moment's notice and thoroughly aired and cleansed.

In Fig. 5 I have shown my refrigerator-cylinder adapted as a self-containing freezer or churn. The cylinder is apertured, as at 22, and in this aperture is inserted a containing-receptacle $b$ of desired form and size. In fact, the cylinder may be adapted to receive a plurality of such receptacles. The receptacle $b$ is provided with an exterior flange 23, seating upon the cylinder, and may be closed and secured to the cylinder by any suitable tight-fitting cover connection 24. Where this is to be used as a freezer, the freezing mixture is placed in the cylinder, as before. By simply omitting the freezing mixture the device is applicable as a churn.

The construction of the closures 8 and 24 and manner of their attachment to the cylinder may be as follows: The cylinder-apertures are each provided with an annular flange whose lower side consists of two inclined planes, forming screw-threads. This flange is cut by four notches. On this flange is placed a rubber or other suitable washer in the case of the cover 8, while, with the receptacle $b$, the flange 23 itself may be of rubber, or in case it is made of metal an upper and lower washer would be used. The cover or cap is then inserted. The cover has lugs which engage the inclined faces, and the notches prevent the cover loosening when once it has been properly tightened. An absolutely water-tight joint is thus afforded.

By placing both agitator and roller in one pan the apparatus is not only much simplified compared with similar machines ordinarily in use, but a very considerable saving in expense is effected.

Having thus described my invention, what I claim as new, and desire to secure by Letters Patent, is—

1. A refrigerating apparatus comprising a box, a cover therefor, a horizontal partition in said box, an opening in said partition, a revoluble cylinder in said opening, said cylinder projecting into compartments above and below the partition and adapted to contain a freezing mixture, a containing-pan pivotally mounted in the box, a distributing-roller in said pan, and a means whereby said pan is oscillated to bring the roller and cylinder into contact when the cover is closed upon the box.

2. In a refrigerating apparatus, a box having openings at either end, closures for said openings, a hinged cover for said box, a horizontal partition in said box by which two compartments are formed therein when the cover is closed, an opening in said partition, a revoluble cylinder mounted in said opening and so as to occupy a portion of each compartment above and below the partition said cylinder adapted to contain a freezing mixture, and means whereby an article to be frozen may be submitted to the action of said mixture.

3. A refrigerating apparatus comprising a box, a cover therefor, a revoluble cylinder in said box, a containing-pan pivotally mounted in the box beneath said cylinder, a distributing-roller and an agitator mounted in said pan, a spring extension on the rear of said pan adapted to be engaged by the cover when the latter is closed so as to oscillate the pan and bring the agitator and roller into contact with the cylinder whereby the roller, agitator and cylinder are revoluble in unison.

4. In a refrigerating apparatus, the combination of a box, a revoluble cylinder in said box and adapted to contain a freezing mixture, a containing-pan pivotally mounted beneath said cylinder, a distributing-roller in said pan, a cover for said box and resilient connections between said cover and pan whereby the latter is tilted, when the former is closed, to cause the surfaces of said distributing-roller and cylinder to be brought into contact.

In witness whereof I have hereunto set my hand.

SAMUEL SWEENEY.

Witnesses:
S. H. NOURSE,
JESSIE C. BRODIE.